No. 816,356. PATENTED MAR. 27, 1906.
H. McCONNELL.
CULINARY VESSEL.
APPLICATION FILED NOV. 7, 1904.
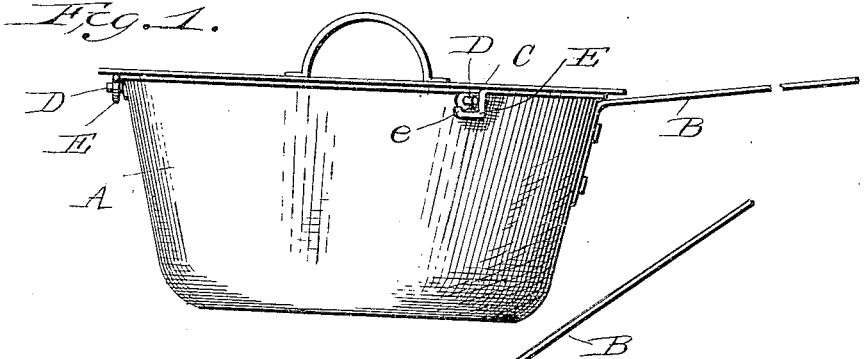
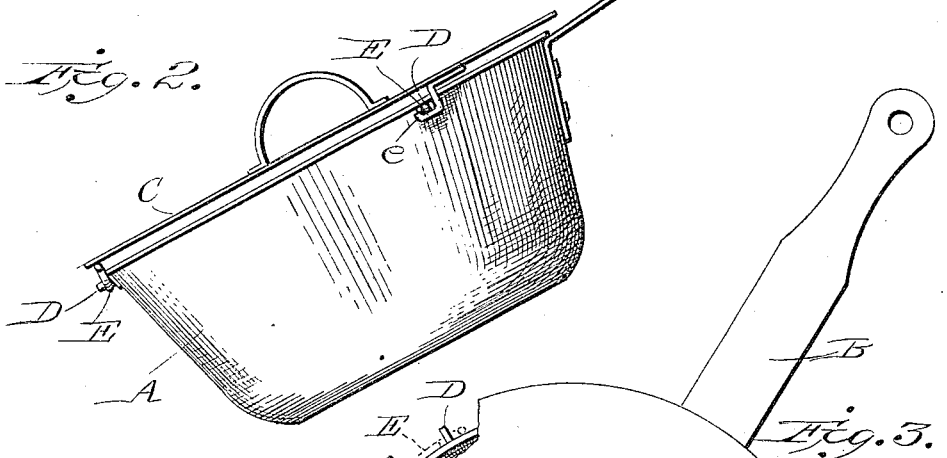
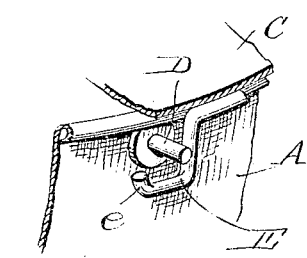
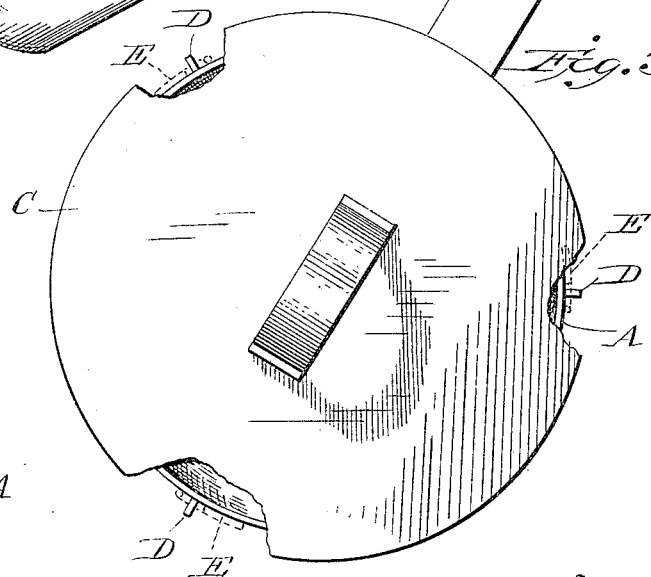
Witnesses
Edwin L. Yewell
Thomas Durant
Inventor
Henry McConnell
By
his Attorneys

UNITED STATES PATENT OFFICE.

HENRY McCONNELL, OF MINNEAPOLIS, MINNESOTA.

CULINARY VESSEL.

No. 816,356. Specification of Letters Patent. Patented March 27, 1906.

Application filed November 7, 1904. Serial No. 231,773.

*To all whom it may concern:*

Be it known that I, HENRY McCONNELL, a citizen of the United States, residing at Minneapolis, in the county of Hennepin and State of Minnesota, have invented certain new and useful Improvements in Culinary Vessels; and I do hereby declare the following to be a full, clear, and exact description of the same, reference being had to the accompanying drawings, forming a part of this specification, and to the letters of reference marked thereon.

This invention relates to improvements in vessels designed more especially for holding articles of food to be cooked, the objects of the invention being to provide a simple, cheap, and efficient structure capable of use as a drainer for effectually separating the liquid and solid contents.

A further object of the invention is to provide a construction or arrangement capable of use in connection with cooking or culinary utensils of any form or construction.

The invention consists in certain novel details of construction and combinations and arrangements of parts, all as will be now described, and pointed out particularly in the appended claim.

Referring to the accompanying drawings, Figure 1 is a side elevation of an ordinary saucepan embodying the present improvements. Fig. 2 is a view showing the saucepan turned into position for draining off the liquid contents. Fig. 3 is a top plan view with portions of the cover broken away to show the retainers. Fig. 4 is a detail of one of the retainers.

Like letters of reference in the several figures indicate the same parts.

The vessel illustrated is in the form of an ordinary saucepan having a tapering body A and handle B; but it will be understood that while the invention is applicable to this type of vessel it is by no means restricted thereto, but is capable of use in connection with vessels of any usual or preferred shape or construction.

In connection with vessels for culinary purposes a cover is usually provided, and such cover is preferably one which is substantially flat or only slightly beaded, so as to fit the vessel somewhat loosely and be capable of easy cleansing. In accordance with the present invention provision is made whereby the cover—such, for instance, as indicated at C in the drawings—may be connected with the body of the vessel in such manner that it will normally and by its own weight rest on the vessel so as to close the same, but will also be capable of a slight separation, so as to permit the liquid contents to drain away without the escape of the solid contents of the vessel when the latter is tilted or turned as shown, for instance, in Fig. 2. The form of the connection between the cover and body of the vessel is such that the cover cannot become accidentally detached by any ordinary manipulation of the body; but at the same time it may, when desired, be easily and quickly either applied or removed, and the attaching means are of such character as to form the least possible obstruction to cleaning.

In the preferred construction the body of the vessel is provided on the outside near its upper edge with a series of projections D, equally spaced and three or more in number. A corresponding number of hooks or hook-shaped projections E are provided on the under side of the cover in position to extend down past the projections on the body and when the cover is given a partial rotation to engage the said projections loosely. The hook portions of the projections E are preferably relatively long horizontally to insure engagement and the ends *e* are turned up sufficiently to just permit them to pass beneath the projections D when the cover is down on the vessel. By reason of this arrangement a slight upward or outward movement of the cover after the projections have been brought into engaging position will absolutely prevent the possible accidental disengagement of the cover, and consequently the vessel may be tilted or reversed without the escape of any of its solid contents. At the same time sufficient space or play is allowed in the hooks to permit the cover to separate slightly from the body of the vessel to provide for the ready escape of the liquid contents.

In the preferred construction, where the handle B projects from one side of the vessel, the projections D and E are arranged one practically opposite the handle and the other two at equal distances therefrom and from each other, the handle thus projecting approximately midway between two of the projections. With this arrangement it is found that better clearance is afforded for the escape of the liquid and there is less liability of the accidental release of the cover when the vessel is inverted.

The arrangement is simple, inexpensive, applicable to practically any and all vessels such as are used for culinary purposes, and in practice has proven itself to be highly efficient and advantageous. It will also be noted that by the employment of a flat cover without a depending flange the entire cover will be upon the outside of the vessel and there will be no portion extending into the vessel to obstruct the outpouring of the contents.

Having thus described my invention, what I claim as new, and desire to secure by Letters Patent, is—

A culinary vessel from which the liquid contents may be drained without the escape of the solid contents, embodying a receptacle having radial projections on the outside, at equal distances from each other, a substantially flat cover engaging with the top edge only of the receptacle and located entirely without the receptacle, hook-shaped projections depending from the under side of the cover for coöperation with the radial projections, the hook portions of said projections being extended horizontally and the ends bent upwardly to just pass the radial projections when the cover rests on the vessel, but adapted to engage said projections when the cover is raised, the space between the radial projections and bodies of the hooks being sufficient to permit the cover to separate slightly from the receptacle without becoming detached, whereby a drainage-space is provided; substantially as described.

HENRY McCONNELL.

Witnesses:
   JAS. C. ANDREWS,
   E. DODGE.